(12) United States Patent
Abbott

(10) Patent No.: US 7,156,403 B2
(45) Date of Patent: Jan. 2, 2007

(54) MOTORCYCLE TOWING DOLLY FOR LOW TRUCKS

(75) Inventor: Larry Bruce Abbott, Irving, TX (US)

(73) Assignee: The Eleanor G. Taylor Trust, San Diego, CA (US)

(*) Notice: Subject to any disclaimer, the term of this patent is extended or adjusted under 35 U.S.C. 154(b) by 35 days.

(21) Appl. No.: 10/895,544

(22) Filed: Jul. 21, 2004

(65) Prior Publication Data

US 2005/0017470 A1 Jan. 27, 2005

Related U.S. Application Data

(60) Provisional application No. 60/489,656, filed on Jul. 24, 2003.

(51) Int. Cl.
*B62B 3/04* (2006.01)

(52) U.S. Cl. .................... 280/79.11; 280/79.4; 414/462

(58) Field of Classification Search ................ 280/402, 280/404, 456.1, 79.11, 79.4, 79.6; 414/462, 414/463, 464, 465; 224/521
See application file for complete search history.

(56) References Cited

U.S. PATENT DOCUMENTS

| 3,822,898 | A |   | 7/1974  | Brownlie |         |
|-----------|---|---|---------|----------|---------|
| 4,111,449 | A |   | 9/1978  | Hancock  |         |
| 4,243,243 | A |   | 1/1981  | Edmisten |         |
| 4,592,564 | A |   | 6/1986  | Warnock et al. |   |
| 5,011,361 | A |   | 4/1991  | Peterson |         |
| 5,123,802 | A | * | 6/1992  | Bell     | 414/563 |
| 5,145,308 | A |   | 9/1992  | Vaughn et al. |    |
| 5,228,712 | A | * | 7/1993  | Speier   | 280/401 |
| 5,366,338 | A |   | 11/1994 | Mortensen |        |
| 5,620,197 | A |   | 4/1997  | Howes    |         |
| 5,794,959 | A |   | 8/1998  | Scheef, Jr. |     |
| 5,893,571 | A | * | 4/1999  | Nowell   | 280/43  |
| 6,095,746 | A | * | 8/2000  | Bergin   | 414/430 |
| 6,109,494 | A | * | 8/2000  | Pilmore  | 224/547 |
| 6,186,727 | B1| * | 2/2001  | Hamilton | 414/426 |
| 6,244,813 | B1|   | 6/2001  | Cataldo  |         |
| 6,581,954 | B1| * | 6/2003  | Chadwick | 280/491.1 |
| 6,682,292 | B1|   | 1/2004  | Estes    |         |
| 6,860,496 | B1| * | 3/2005  | Novak et al. | 280/79.11 |

OTHER PUBLICATIONS

AW Direct Towing Recovery and Service Vehicle Accessories; http//www.awdirect.com/awdirect/catalog.cfm?dest=itempg &itemi...; 4 pages.

\* cited by examiner

*Primary Examiner*—J. Allen Shriver
*Assistant Examiner*—Brian Swenson
(74) *Attorney, Agent, or Firm*—Mark W. Handley; Chauza & Handley, LLP

(57) ABSTRACT

A motorcycle towing device (12) for flat bed tow trucks (6) and wheel lift tow trucks (8) has a front wheel support plate (44) having a front wheel lateral support member (48), and a rear wheel support plate (100) having rear wheel lateral support members (124, 126). Tie down straps 24 secure a motorcycle (10) to the front wheel support plate (44) and to the front wheel lateral support member (48), and to the rear wheel support plate (100) and between the rear wheel lateral support members (124, 126). In one embodiment, the front wheel support plate (44) and the rear wheel support plate (100) are mounted to casters (84) for loading the motorcycle (10) onto the flat bed tow truck (6). In another embodiment, the front wheel support plate (44) and the rear wheel support plate (100) are mounted to a wheel lift tow truck (8).

17 Claims, 10 Drawing Sheets

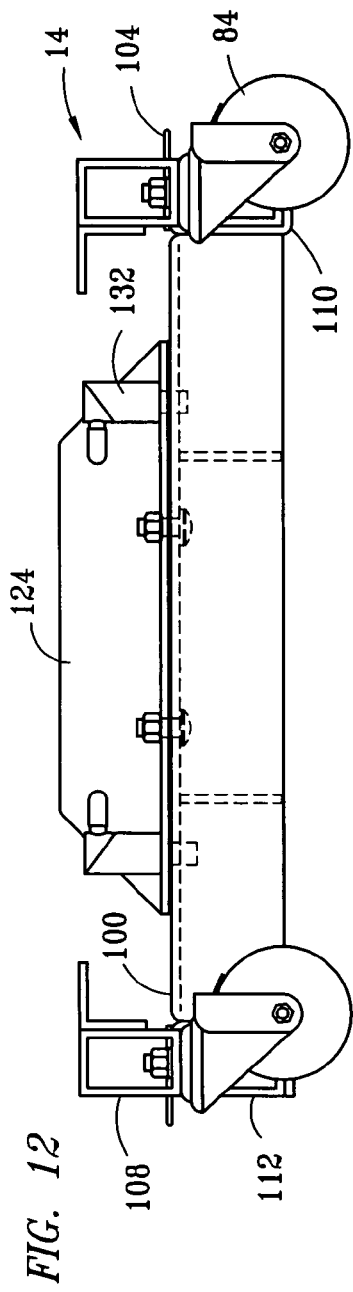
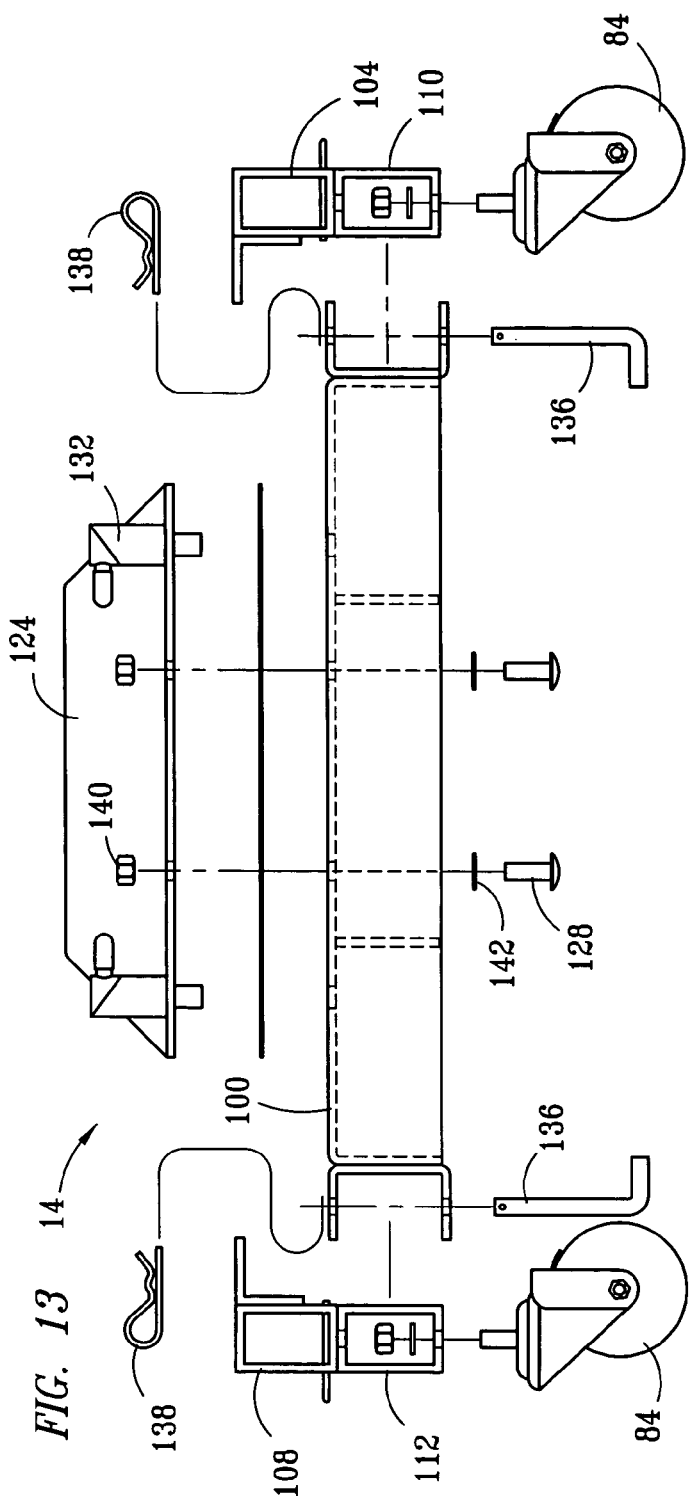
FIG. 12
FIG. 13

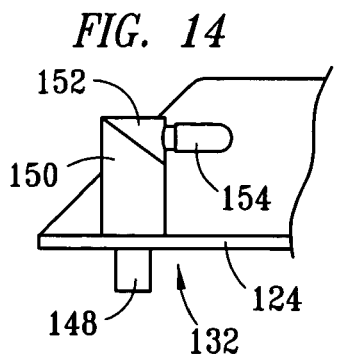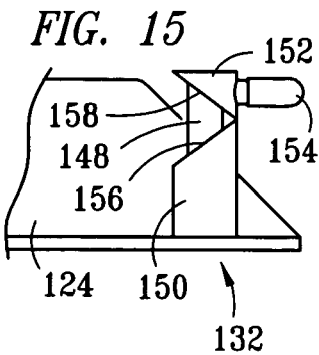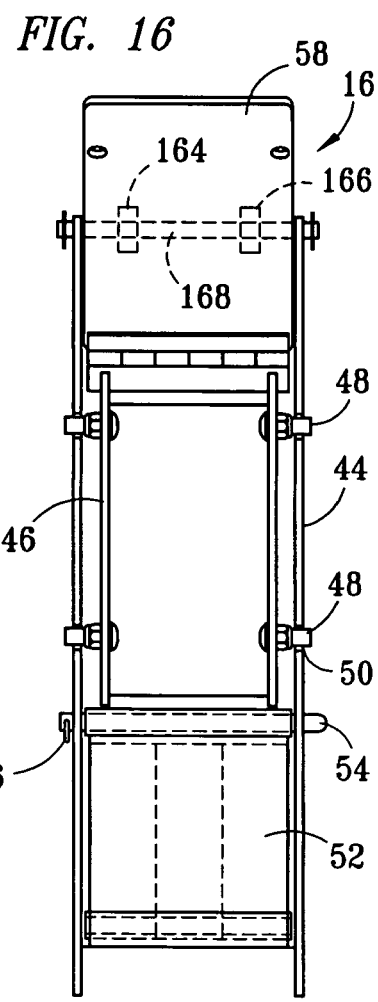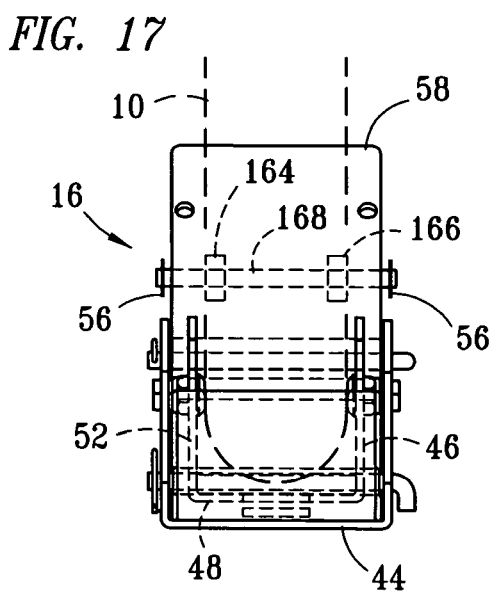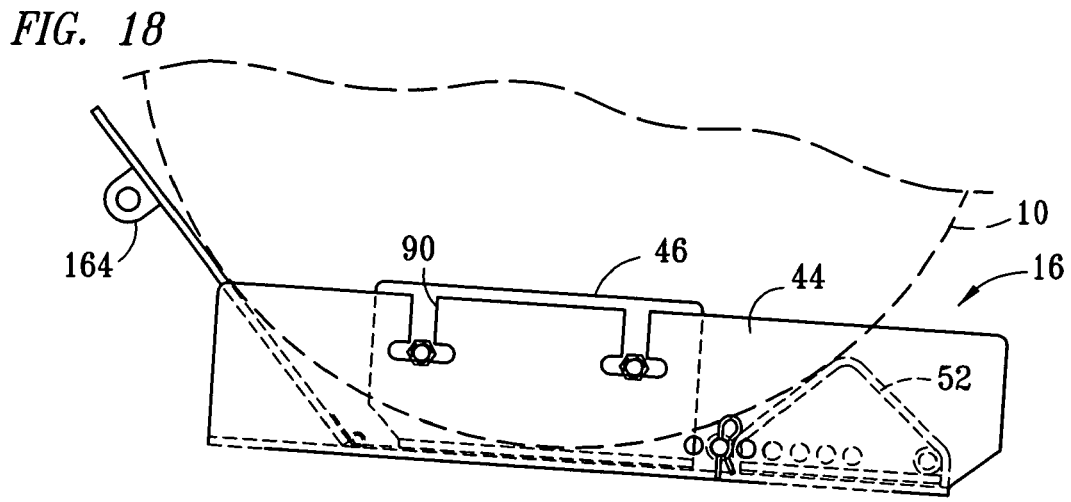

US 7,156,403 B2

MOTORCYCLE TOWING DOLLY FOR LOW TRUCKS

TECHNICAL FIELD OF THE INVENTION

The present invention is related to fixtures for tow trucks, and in particular to a towing dolly for towing motorcycles with flat bed tow trucks and wheel lift tow trucks.

CROSS-REFERENCE TO RELATED APPLICATION

The present application is related to U.S. Provisional Patent Application Ser. No. 60/489,656, entitled "Motorcycle Towing Dollies for Use with Flat Bed and Wheel Lift Tow Trucks," and filed Jul. 24, 2003, and invented by Larry Bruce Abbott, and assigned to Julia Diann Abbott, and the Eleanor G. Taylor Trust, with Trustee of Eleanor G. Taylor, the assignees of the present application.

BACKGROUND OF THE INVENTION

Motorcycles often weigh more than one or two persons can lift for loading the motorcycles onto tow vehicles. Tow trucks which have been provided for towing automobiles and pick up trucks are not easily adaptable for towing motorcycles. Flat bed tow trucks have wenches for pulling automobiles and pick up trucks onto the bed of the flat bed tow truck. Since automobile and pick up trucks have four wheels which are spaced apart there is usually not a concern of whether the automobile or pick up truck being loaded will tip over while being pulled aboard a flat bad tow truck. However, with motorcycles, which must balance on two inline wheels, there are concerns regarding tipping over and causing damage to a motorcycle while pulling the motorcycle aboard a flat bed tow truck with a wench. Similarly, with wheel lift tow trucks, which have hydraulic masts and booms with outrigger arms for extending underneath motor vehicles, motorcycles have been damages when attempting to tow a motorcycle with wheel lift tow trucks. Towing dollies have always been provided for aiding in loading motorcycles aboard flat bet wreckers, but these tow dollies typically were easily damaged and often cause damage to motorcycles being loaded aboard flat bed type tow trucks.

SUMMARY OF THE INVENTION

A tow dolly is provided for towing for adapting motorcycles for loading aboard flat bed tow trucks. The tow dolly may also be utilized for mounting to a mast and a boom of a wheel lift tow truck for mounting motorcycles aboard the tow truck for transport. A first motorcycle towing device for use with flat bed and wheel lift tow trucks has a front wheel support plate with a U-shaped lateral support member. A second motorcycle towing device has a rear wheel support plate with two lateral support members which are slidably secured to the rear wheel support. Tie down straps are provided for securing a motorcycle to the two towing devices. In one embodiment, the first and second motorcycle towing devices having outriggers and caster wheels for loading motorcycles onto flat bed tow trucks. In another embodiment, the first and second towing devices are mounted directly to the mast and boom of a wheel lift tow truck.

DESCRIPTION OF THE DRAWINGS

For a more complete understanding of the present invention and the advantages thereof, reference is now made to the following description taken in conjunction with the accompanying Drawings in which FIGS. 1 through 21 show various aspects and ornamental designs for motorcycle towing dolly for tow truck devices made according to the present invention, as set forth below:

FIG. 1 is a side elevation view of a flat bed tow truck having a motorcycle which is mounted atop the flat bed tow truck on dollies;

FIG. 2 is a side elevation view of the wheel of tow truck having a motorcycle mounted there aboard secured to the wheel of tow truck, the fixtures are generally the same as the tow dollies, respectively, except that the tow fixtures have been mounted directly to the mast and beam of the wheel of tow truck, whereas the tow dollies have caster wheels mounted thereon and outriggers to which a portion of the caster wheels are mounted holding the motorcycle up the rearward end of the flat bed tow truck;

FIG. 3 is a side elevation view of the motorcycle mounted atop dollies, and shows a preferred method of securing the motorcycle to the dollies;

FIG. 4 is a top view showing the bridal for securing the handle bars and a top portion of the frame of the motorcycle;

FIG. 5 is a top view of a first tow dolly for the front wheel of the motorcycle;

FIG. 6 is a front elevation view of the first tow dolly;

FIG. 7 is an exploded view of the first tow dolly;

FIG. 8 is a left side elevation view of the first tow dolly;

FIG. 9 is a right side elevation view of the first tow dolly;

FIG. 10 is a top view of a second tow dolly for the rear wheel of the motorcycle;

FIG. 11 is an end elevation view of the second tow dolly;

FIG. 12 is a side elevation view of the second tow dolly;

FIG. 13 is an exploded, side elevation view of the second tow dolly;

FIG. 14 is a side elevation view of the cam lock, showing a lock pin in an extended position;

FIG. 15 is a side elevation view of the cam lock, showing the lock pin in a retracted position;

FIG. 16 is a top view of a first towing fixture for the front wheel of the motorcycle;

FIG. 17 is an end view of the first towing fixture;

FIG. 18 is a side elevation view of the first towing fixture;

FIG. 19 is a top view of a second towing fixture for the rear wheel of the motorcycle;

FIG. 20 is a front elevation view of the second towing fixture;

FIG. 21 is a side elevation view of the second towing fixture;

DETAILED DESCRIPTION OF THE INVENTION

Figure 1:
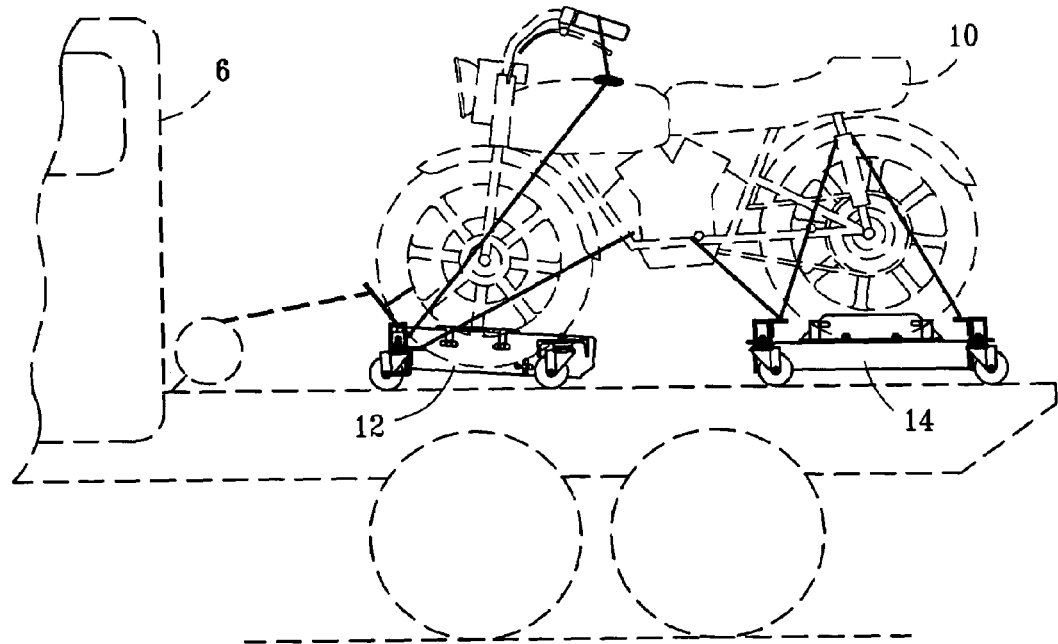

FIG. 1 is a side elevation view of a flat bed tow truck 6 (shown in phantom) and a motorcycle 10 (shown in phantom) which is mounted atop the flat bed tow truck 6 on dollies 12 and 14. Preferably, the motorcycle 10 will be loaded aboard the dollies 12 and 14 using a motorcycle jack to first lift up one end of the motorcycle 10 and place a wheel of the lifted end onto one of the dollies 12 or 14, and then the motorcycle jack is used to lift the other end of the motorcycle 10 and place the wheel of the other end of the motorcycle 10 onto the other of the dollies 12 or 14. The motorcycle 10 will then be loaded aboard the flat bed tow truck 6 using a winch of the tow truck 6 to pull the motorcycle 10 aboard the flat bed tow truck 6 on the dollies 12 and 14.

Figure 2:
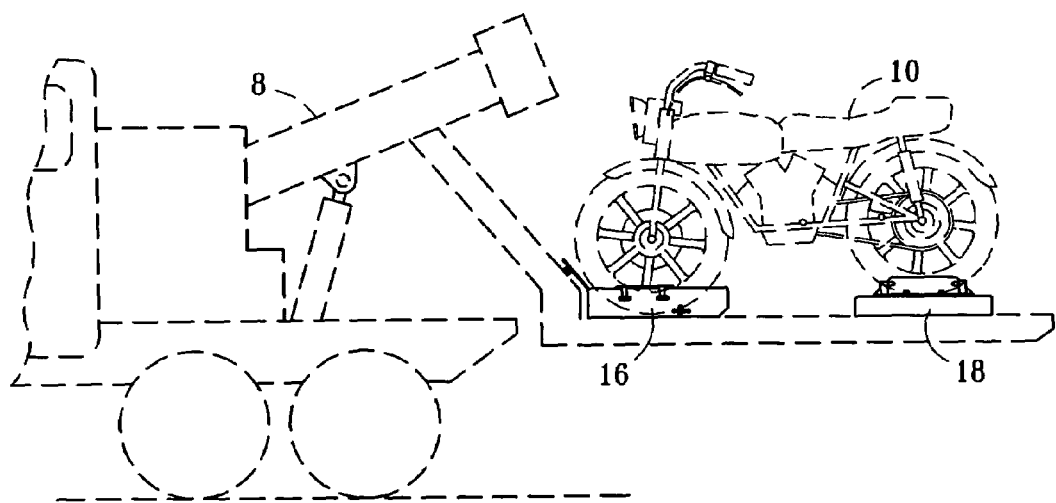

FIG. 2 is a side elevation view of a wheel lift type tow truck 8 (shown in phantom) having a motorcycle 10 (shown in phantom) mounted aboard the boom and mast of the tow truck 8. The motorcycle 10 is secured to the tow truck 8 with the fixtures 16 and 18, which are generally the same fixtures as used for the tow dollies 12 and 14, respectively, except that the tow fixtures 16 and 18 have been mounted directly to the mast and boom of the wheel lift tow truck 8, whereas the tow dollies 12 and 14 have caster wheels and outriggers. A portion of the caster wheels are mounted to the outriggers, which extend to stabilize the motorcycle.

Figure 3:
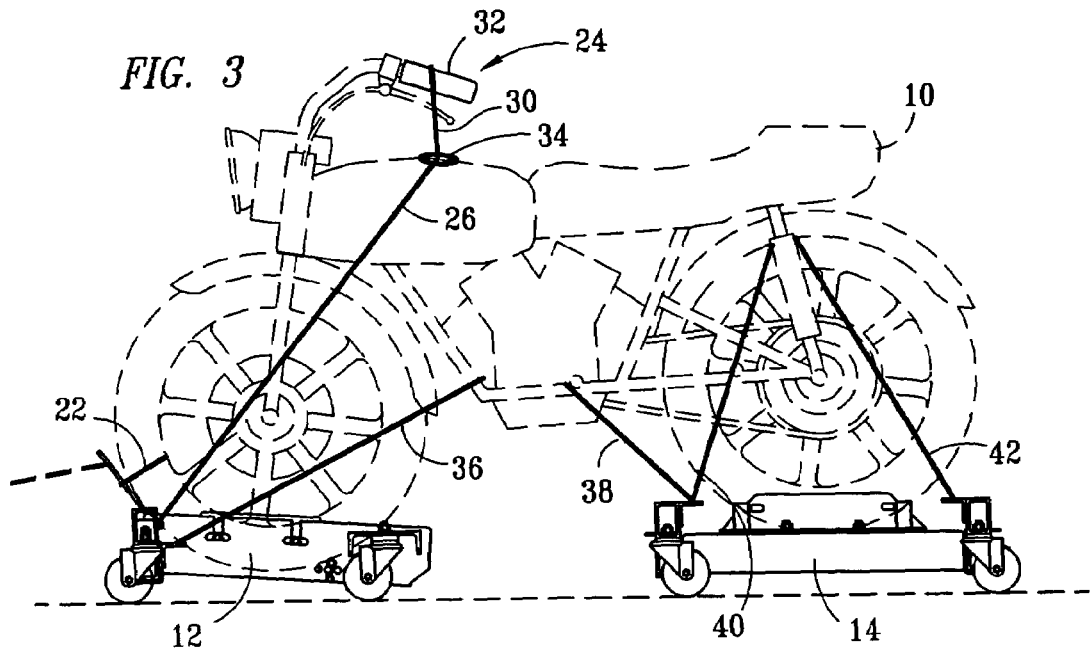

FIG. 3 is a side elevation view of the motorcycle 10 (shown in phantom) mounted atop dollies 12 and 14, and shows a preferred method of securing the motorcycle 10 to the dollies 12 and 14. A front wheel tie down strap 22 extends from the forward end of the dolly 12 around the forward end of the front wheel of the motorcycle 10. A bridal 24 extends from a front end of the fixture 12, preferably an outrigger, with a tie down strap 26 which extends to a cup 32 which fits over one end of the handlebars of the motorcycle 10. Another tie down strap 36 extends from the front lower end of the frame to an outrigger disposed on the forward end of the tow dolly 12. A tie down strap 38 extends from the forward end of the frame of the motorcycle 10 to a forward end of the fixture 14. A tie down strap 40 extends from the forward end of the fixture 14 up to a rearward end of the frame of the motorcycle 10. A tie down strap 42 extends from a rearward end of the frame of the motorcycle 10 downward to a rearward end of the tow dolly 14.

Figure 4:
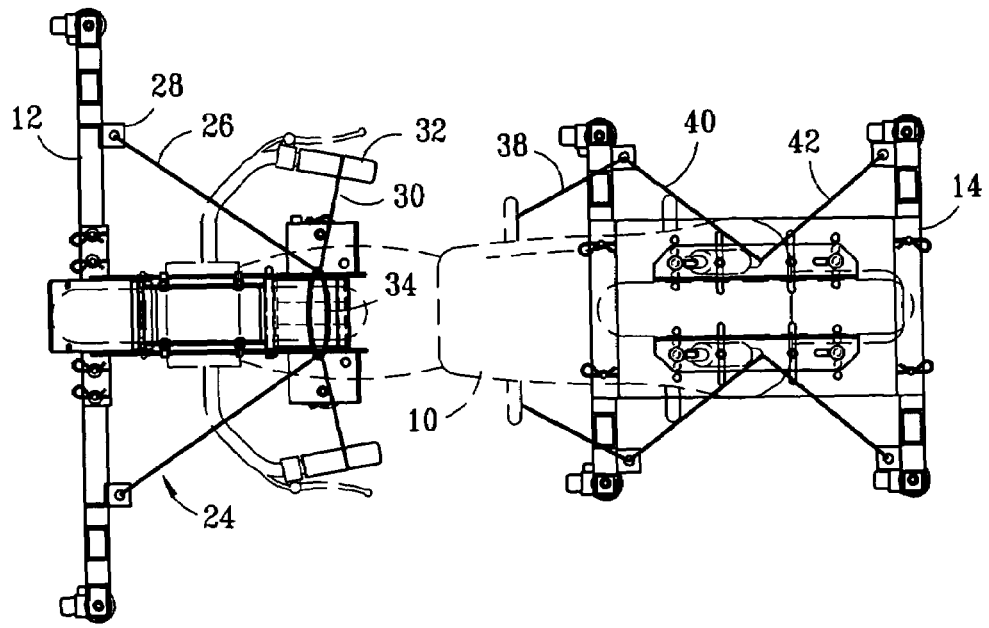

FIG. 4 is a top view showing the bridal 24 for securing the handle bars and a top portion of the motorcycle 10 (shown in phantom). In particular, the connecting strap 34 extends around the tie down straps 30 and 26. A clip 28 is provided at each end of the tie down strap 26 for connecting to an outrigger of the tow dolly 12. The bridal 24 may also be used for the wheel lift tow truck 8. When used for the wheel lift tow truck 8, the bridal 24 will be secured to an outrigger of the mast or boom of the wheel lift tow truck 8 rather than to an outrigger of the tow dolly 12.

Figure 5:
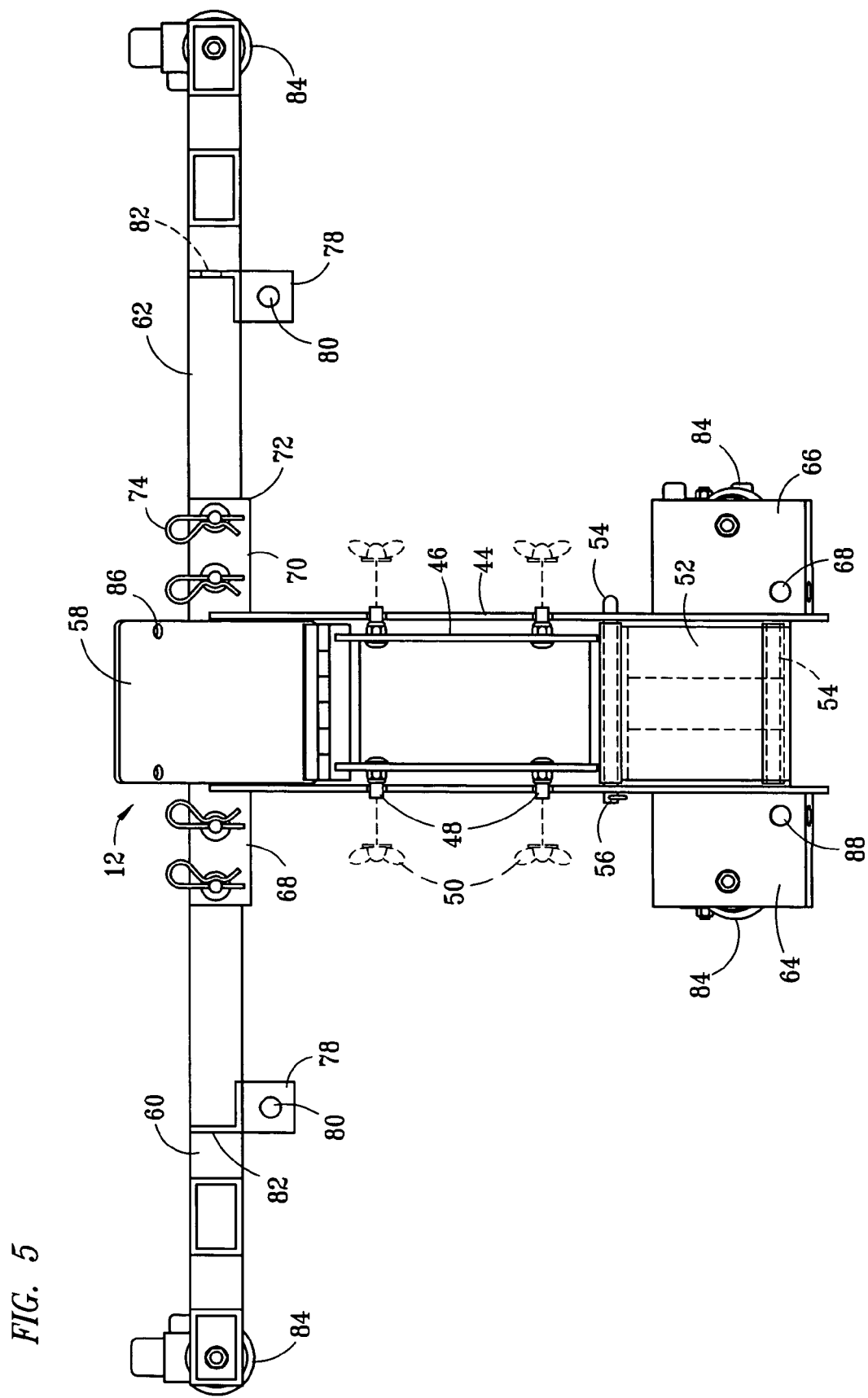
Figure 6:
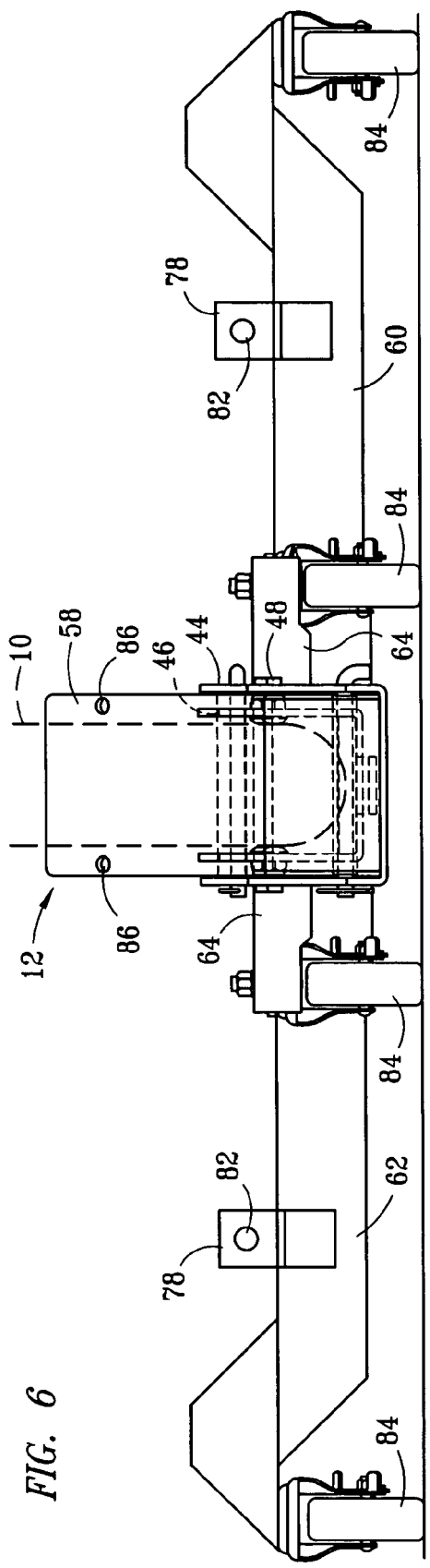
Figure 7:
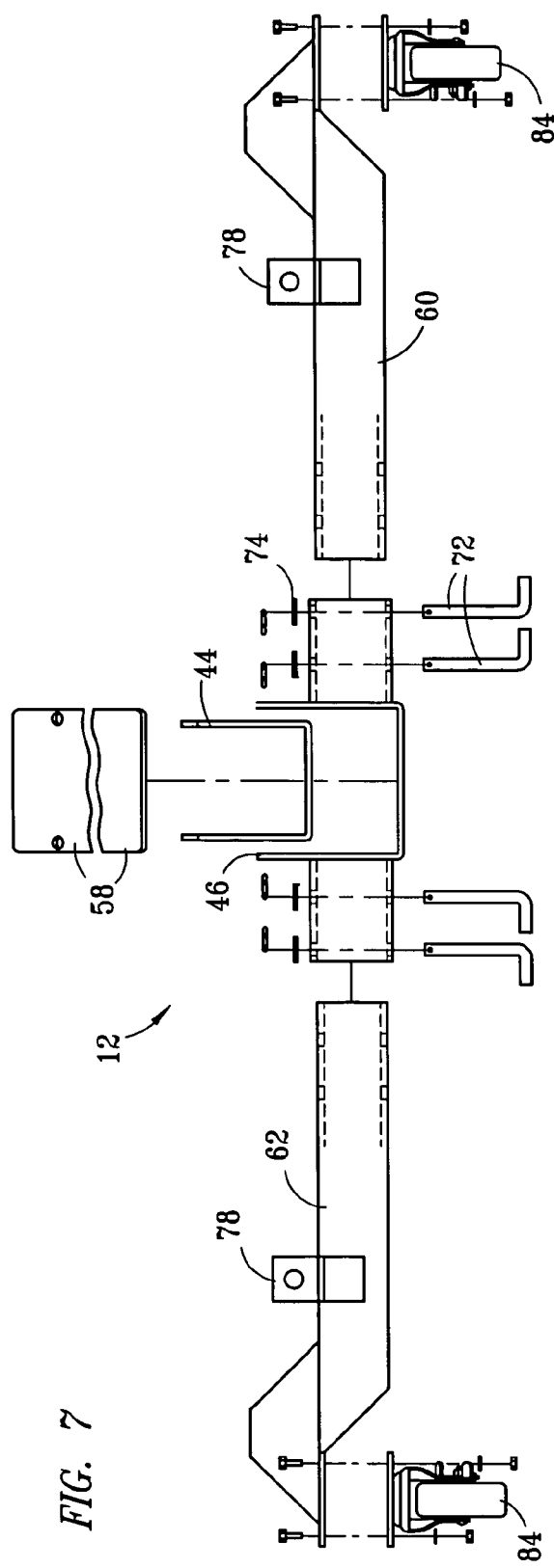

FIG. 5 is a top view, FIG. 6 is a front view, and FIG. 6 is a front elevation view of the tow dolly 12. Tow dolly 12 includes a front wheel support plate 44 and a front wheel insert 46, which provides a lateral support member. The front wheel support plate 44 and the front wheel insert 46 are each U-shaped sheet metal plates. The front wheel insert 46 is secured within the front wheel support plate 44 by four bolts 48, preferably having wing nuts 50. The tow dolly 12 further includes wheel chock 52 which is secured within the front wheel support plate 44 by two pins 54. The pins 54 are secured to tubular end portions 55 of opposite ends of the wheel chock 52 and through holes in the sides of the front wheel support plate 44. The pins 54 are secured within the tubular end portions 54 and through the holes 92 in the sides of the front wheel support plate 44 by cotter rings 56. A front stop plate 54 extends upward from the wheel front wheel support plate 44 at an angle to the horizontal surface, and preferably is welded to the front wheel support plate 44. Two outriggers 60 and 62 extend laterally aside from the forward end of the front wheel support plate 44. Wheel mounting brackets 64 and 66 are provided for mounting the wheels 84. Outrigger mounting brackets 68 and 70 are provided for securing the outriggers 60 and 62 to the front wheel support plate 44. Four mounting bolts 72 are secured through the outrigger mounting brackets 68 and 70 to the inward ends of the outrigger 60 and 62. Cotter pins 74 are secured to the mounting bolts 72 within the outrigger mounting brackets 68 and 70.

The outriggers 60 and 62 each include a tie down bracket 78, which are preferably disposed at intermediate portions of the outriggers 60 and 62. The tie down brackets 78 are preferably provided by two pieces of angle iron, and have holes 80 and 82 extending there-through. Casters 84 preferably are mounted to the outward end of the outriggers 60 and 62. Two of the casters 84 are also mounted to the caster mounting brackets of wheel mounting brackets 64 and 66. The castors 84 are shown as having a pin which extends upward in holes formed in the outward ends of the outriggers 60 and 62 and holes formed in the wheel mounting brackets 64 and 66. Other mounting configurations may be used for the castors 84, such as that shown in FIG. 23. The upward portion of the front stop plate 58 preferably has two tether holes 86. The wheel mounting brackets 64 and 66 have tether holes 88. Tie down straps are used for securing to the tether holes 86, the tether holes 80, and the two tether holes 88.

Figure 8:
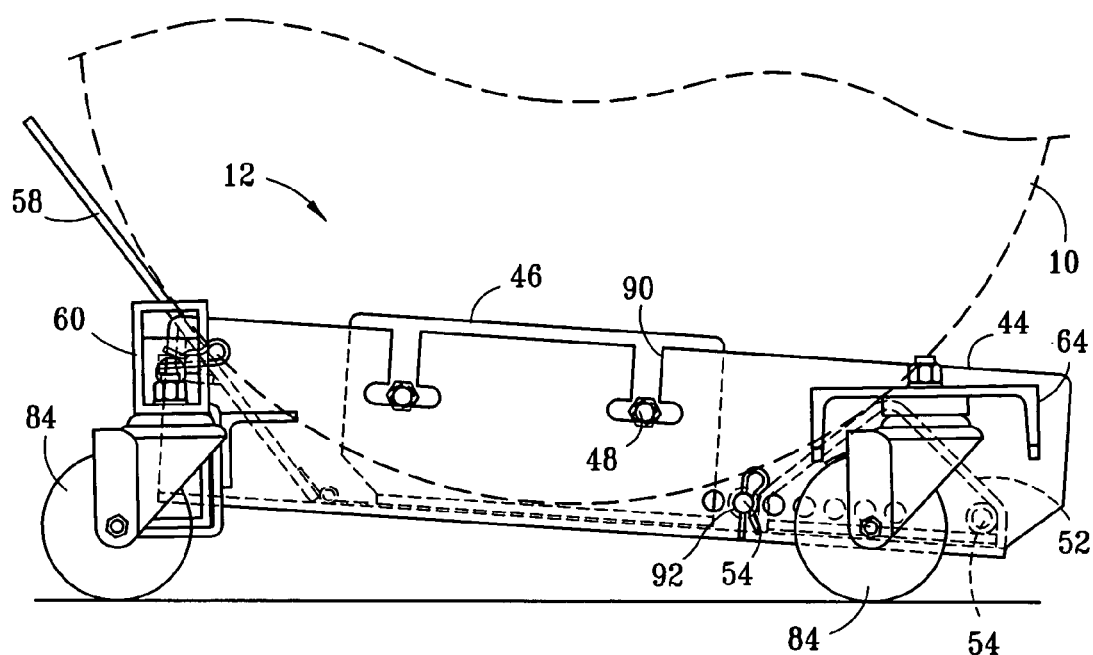
Figure 9:
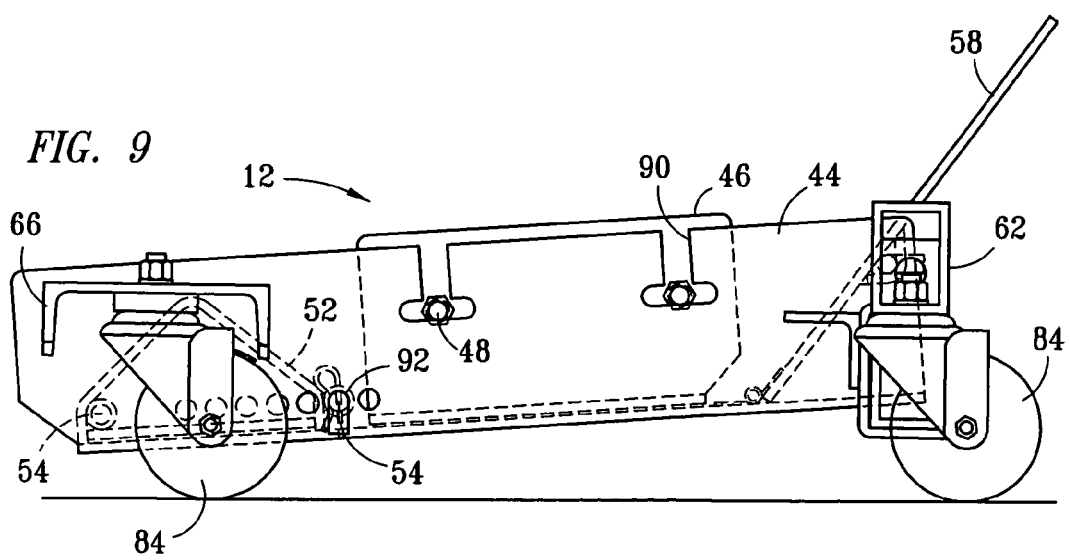

FIG. 8 is a left side elevation view and FIG. 9 is a right side elevation view of the tow dolly 12 for securing to the front wheel of the motorcycle 10. Each side of the ends of the U-shaped front wheel support plate 44 has two T-shaped slots 90. Two T-shaped slots 90 are provided for securing the bolts 48 of the wheel insert 46. It should be noted the lower portions of the T-shaped slots 90 which are located at the lower end of the slots 90 allow the wheel inserts 46 to slide forward or rearwardly once inserted through the slots 90. Holes 92 are also shown in the lower end of the sides of the front wheel support plate 44 for receiving the pins 54 of the wheel chock 52. Holes 92 are provided in the sides of the front wheel support plate 44 for fitting the pins 54 to secure the wheel chock 52 in various forward and rearwardly disposed positions, for adapting the tow dolly 12 for use with motorcycle wheels of various sizes.

Figure 10:
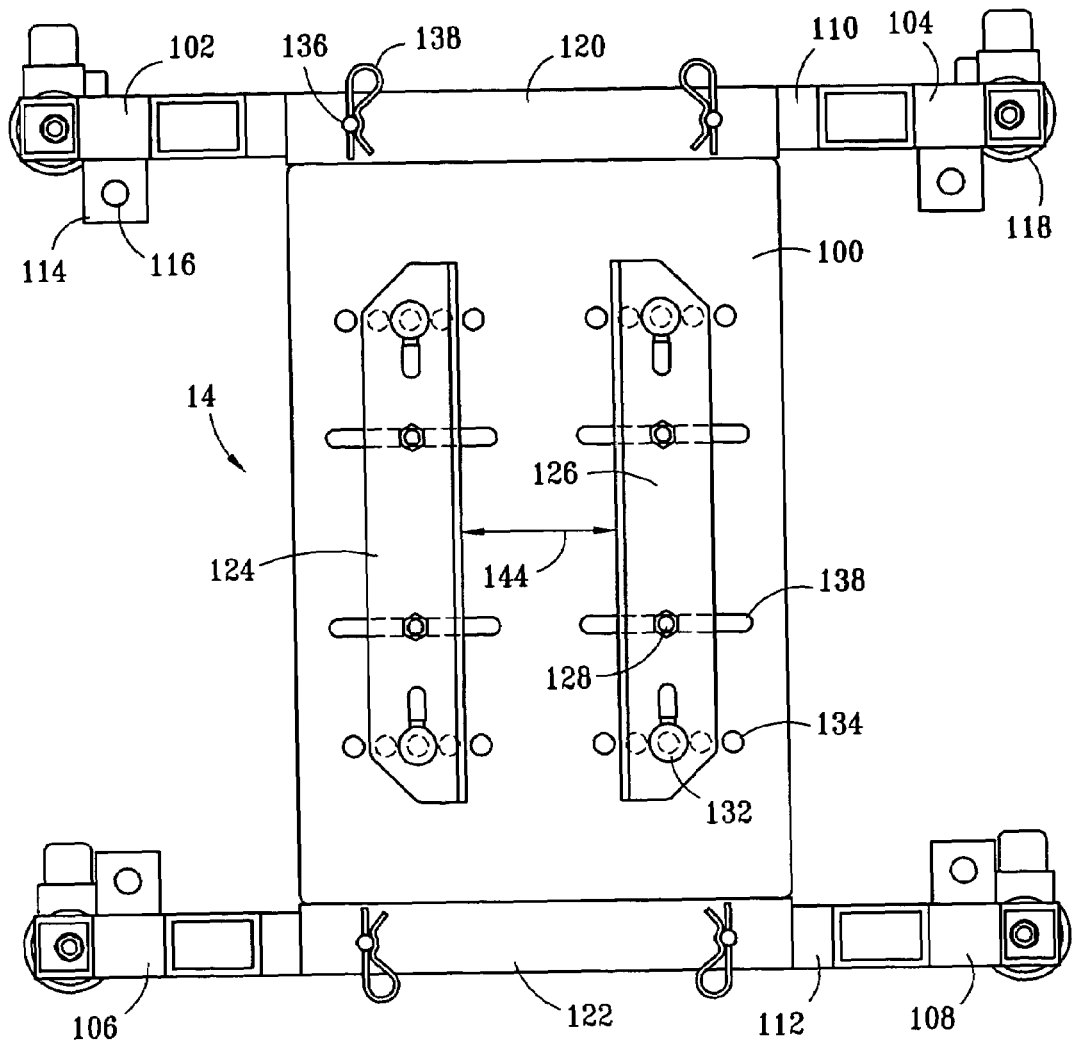
Figure 11:
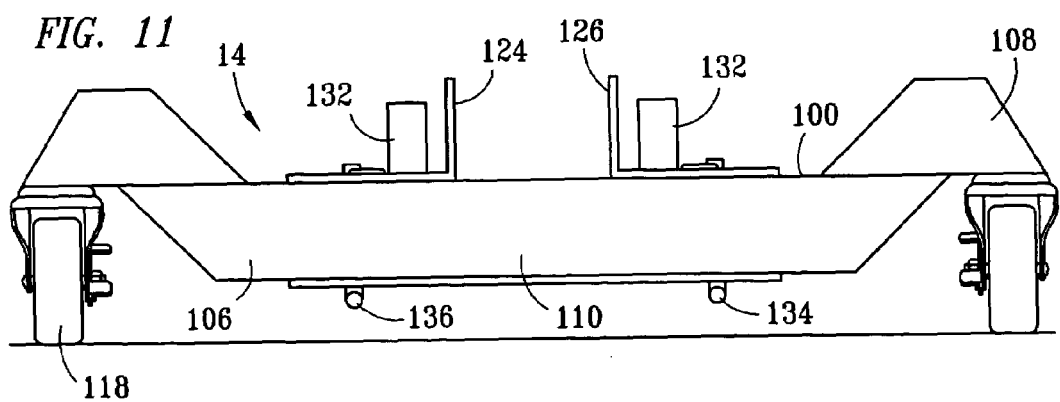

FIG. 10 is a top view, FIG. 11 is an end view, FIG. 12 is a side elevation view, and FIG. 13 is an exploded view of the tow dolly 14. Preferably, the tow dolly 14 is used for securing to the rear wheel of the motorcycle 10. The tow dolly 14 includes a rear wheel support plate 100 having four outriggers 102, 104, 106, and 108. Two of the outriggers 102 and 104 are paired on each side of one end of the rear wheel support plate 100 by a continuous member110, with outriggers 106 and 108 paired on a second side to the continuous member 112 for mounting to a second side of the rear wheel support plate 100. Sections of channel iron are preferably used to provide mounting brackets 120 and 122 on opposite ends of the front wheel support plate 100. The mounting bracket 120 is disposed on one end of the tow dolly 14 and the mounting bracket 122 is disposed on the other end of the tow dolly 14 for securing the members 110 and 112 and respective ones of the outriggers 102 through 108 the two dolly 14. Tie down brackets 114 have holes 116 on each of the outriggers 102, 104. Four casters 102 are mounted to the tow dolly 14, one on each of the outriggers 102 through 108. The outriggers are mounted to each side of the front wheel support plate 100.

Wheel braces 124 and 126 are provided on the tow dolly 14, and extend parallel to a longitudinal direction of the tow dolly 14 and a longitudinal direction along the rear wheel support plate 100. The wheel braces 124 and 126 extend in parallel on opposite sides of the rear wheel of the motorcycle 10. The wheel braces 124 and 126 are each preferably provided by angle iron, and are secured to the upper surface of the rear wheel support plate 100, on opposite sides of the rear wheel of the motorcycle 10. Four bolts 128 extend into slots 130 for slidably securing the wheel braces 124 and 126 atop the rear wheel support plate 100. The four slots 130 each have lengths which extend in the direction 44, which is perpendicular to the longitudinal length of the support plate 100 and the forward direction of the tow dolly 14. The wheel braces 124 and 126 move in the lateral direction 144, which is perpendicular to the length of the support plate 100, that is, perpendicular to the direction from the front to the rearward end of the rear wheel support plate 100. Cam locks 132 are provided, two for each of the wheel braces 124 and 126, for locking the wheel braces 124 and 126 in laterally disposed positions, spaced apart particular distances by moving in lateral directions respective to the length of the wheel support plate 100. Cam locks 132 have ends which will fit within various ones of the holes 134. The holes 134 are provided for securing respective ones of wheel braces 124 and 126 in fixed lateral positions relative to the length of the rear wheel support plate 100, and the forward direction of the tow dolly 14. Bolts 136 have cotter pins 138 which are provided for securing the single members 110 for mounting the outriggers 102 through 108 to the rear wheel support plate 100. Nuts 140 and washers 142 are used in securing the wheel braces 124 and 126 to the rear wheel support plate 100. The casters 184 are mounted to the outriggers 102 through 108.

FIGS. 14 and 15 are two side elevation views of the cam lock 132. The cam lock 132 is shown in FIG. 14 with the lock pin 148 in the extended position, and shown in FIG. 15 with the lock pin 148 in the retracted position. The cam lock 132 includes the lock pin 148, a cam housing 150 and a cam housing 152. A handle 154 is secured to the cam housing 152. The cam housing 150 has a cam surface 156, and the cam housing 152 has a cam surface 158. The cam housings 150 and 152 are mated together such that the cam surfaces 152 and 158 are engaged. The lock pin 148 is secured to the cam housing 152 and rotatingly fits within the cam housing 150. Rotation of the cam housing 152 relative to the cam housing 150 rotates the cam surface 158 relative to the cam surface 156, lifting the cam housing 152 relative to the cam housing 150, and pulling the lock pin 148 inward within the cam housing 150. Preferably, friction will retain the cam housing 152 in the extended position relative to the cam housing 150, shown in FIG. 14, and in the retracted position shown in FIG. 15, until later removed by person operating the cam lock 132. In other embodiments, detents may be provided for retaining the cam housings 150 and 152 in selected relative positions.

FIG. 16 is a top view, FIG. 17 is an end view, and FIG. 18 is a side elevation view of the tow fixture 16 for mounting the front wheel of the motorcycle 10 to the boom and mast of the wheel lift tow truck 8 (shown in phantom in FIG. 2). The tow fixture 16 has the various components of the tow dolly 12, except that the outrigger 60 and 62, the wheel mounting brackets 64 and 66, and outrigger mounting brackets 68 and 70, and the casters 84 are not included. The tow fixture 16 includes the front wheel support plate 44, wheel insert 46, the front stop plate 58, and the wheel chock 52, and the various components which are pertinent to securing the wheel insert 46 and the wheel chock 52, and the front stop plate 58 to the front wheel support plate 44. The front stop plate 58 is welded to the forward end of the support plate 44.

The tow fixture 16 further includes two bosses 164 and 166 having holes there-through for receiving a pin 168. The pin 168 and the two bosses 164 and 166 secure the forward end of the tow fixture 16 to rings (not shown) disposed on the mast of the wheel lift tow truck 8. Such rings on masts are typically standard equipment on the masts of wheel lift tow trucks 8. The bosses 164 and 166 are preferably welded to the forward end of the wheel stop plate 58. The rearward end of the tow fixture 16 may be secured to the mast or boom of the wheel lift tow truck 8, but preferably is not secured directly to the boom of the tow truck 8. Rather, the two bosses 164 and 166, and the pin 168 secure the tow fixture 16 in a fixed position, with the pin 168 also extending through the two rings extending rearward from the mast of extend member wheel lift tow truck 8.

Figure 19:
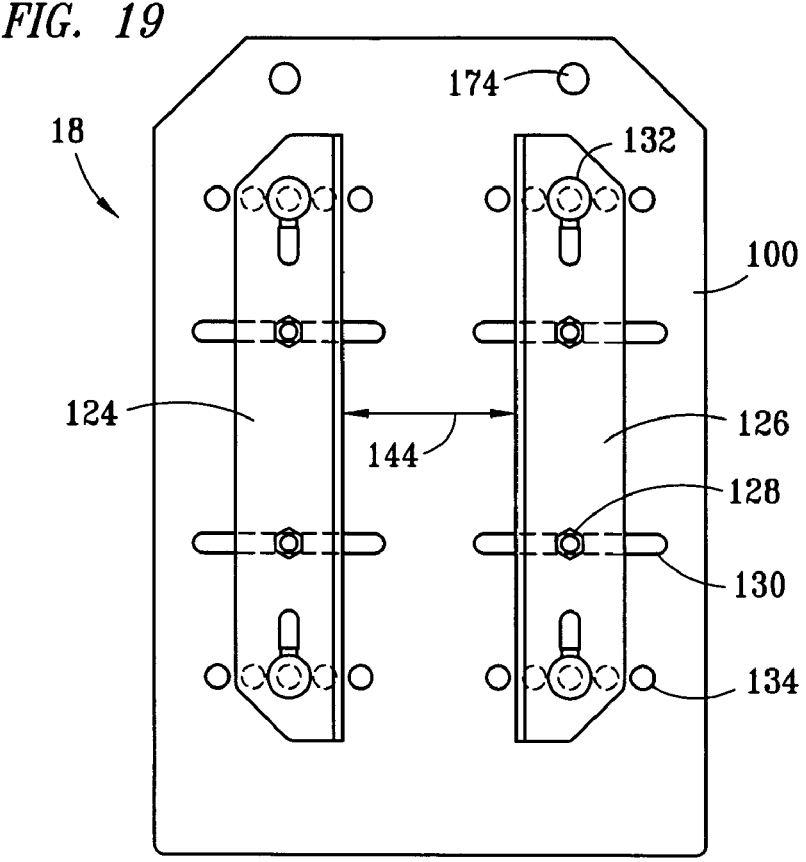
Figure 20:
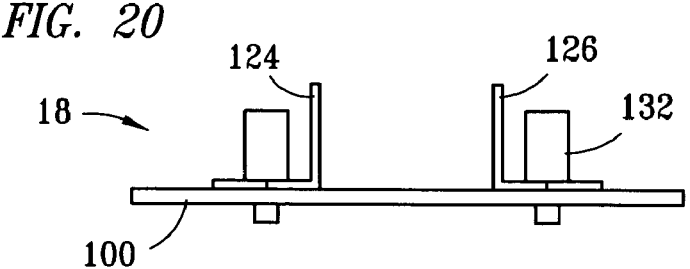
Figure 21:
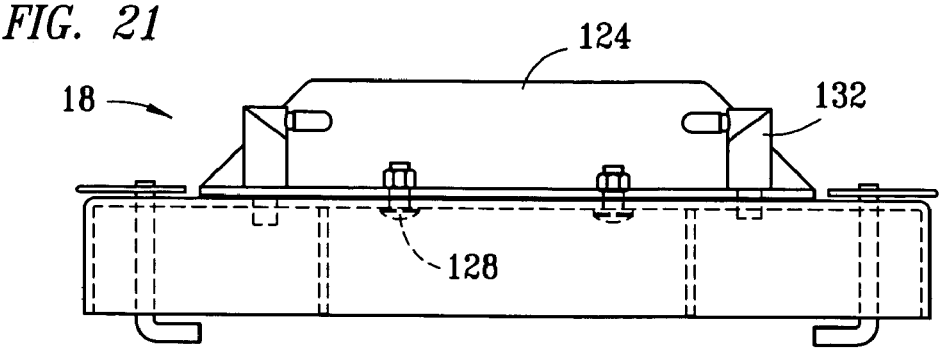
Figure 22:
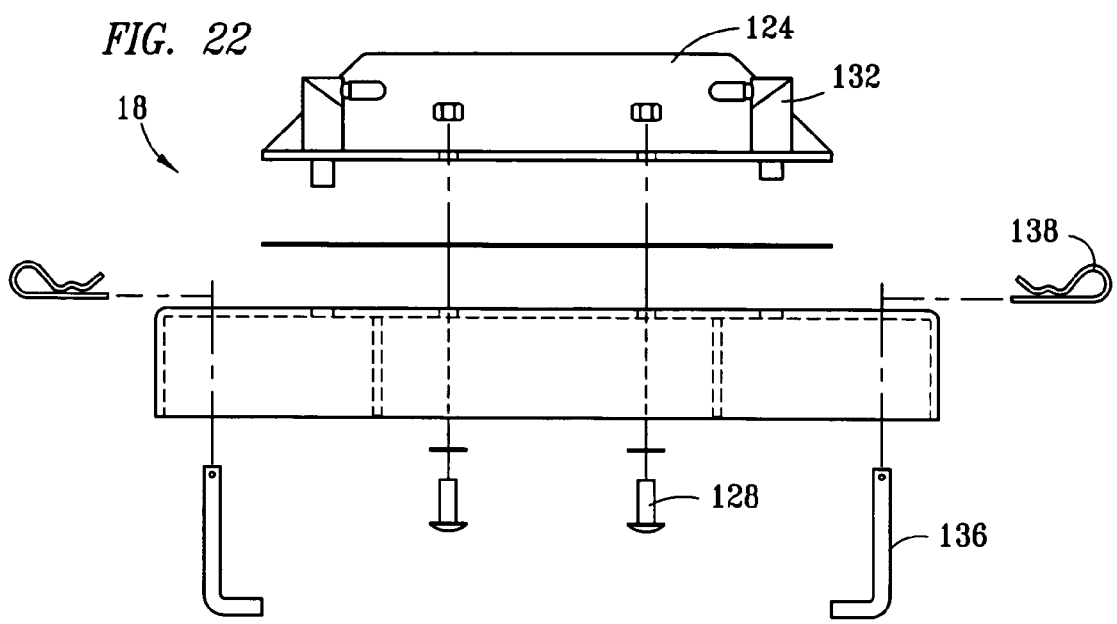
FIG. 22 is an exploded side elevation view of the second towing fixture.

FIG. 19 is a top view, FIG. 20 is an end view, FIG. 21 is a side elevation view, and FIG. 22 is an exploded side elevation view of the tow fixture 18 for securing the rear wheel of the motorcycle 10 to the wheel lift tow truck 8 (shown in FIG. 2). The tow fixture 18 is virtually identical to the tow dolly 14, except that the outriggers 102, 104, 106 and 108, and the mounting brackets 120 and 122, and the continuous bar mounting members 110 and 112 have been omitted. Instead, mounting holes 174 are provided in the rear wheel support plate 100 at four places for bolting the tow fixture 18 to the rearward end of the mast and the boom of the wheel lift tow truck 8. The wheel braces 124 and 126 are provided, slidably secured to the support plate 100 for moving in the lateral directions 144, perpendicular to the longitudinal length of the rear wheel support plate 100 and the mast and the boom of the wheel lift tow truck 8. The cam lock members 132 are provided for fitting within the holes 134 to lock the wheel braces 124 and 126 in fixed positions, laterally aside of each side of the rear wheel of the motorcycle 10.

Figure 23:
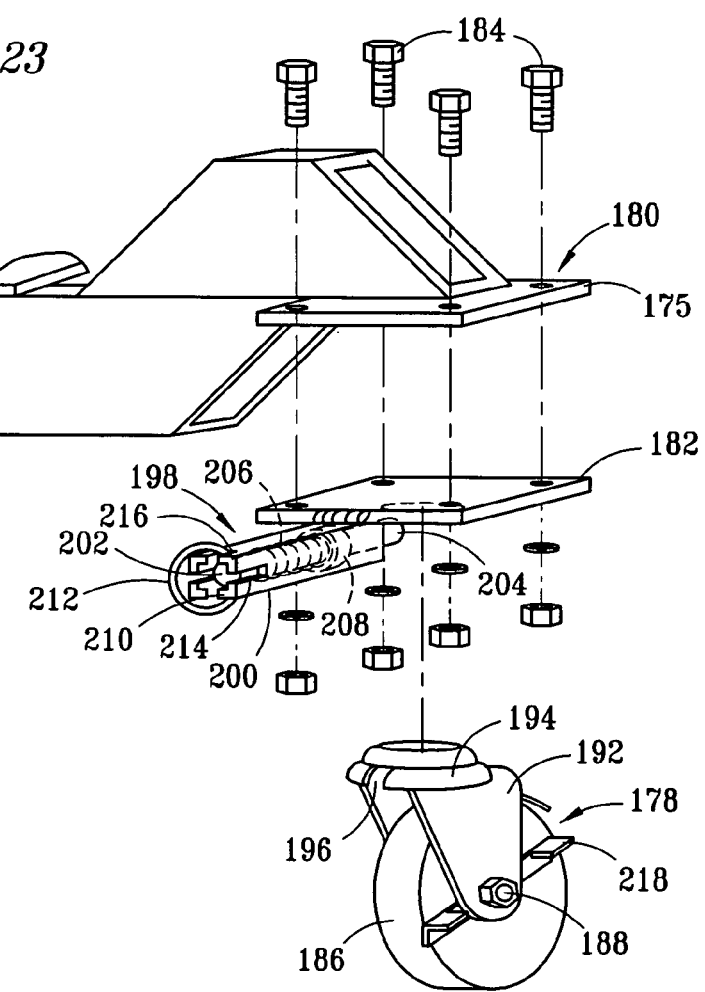
FIG. 23 is an exploded view of a caster and a caster mounting bracket according to one embodiment of the present invention.

FIG. 23 is an exploded view of a caster and a caster mounting bracket according to one embodiment of the present invention. Alternative mounting bracket 180 is shown for securing alternative casters 178 to the tow dollies 14 and 16. The alternative mounting bracket has a lower plate 176 to which the castor plate 182 is mounted with four bolts 184 and nuts 185. The caster wheel 186 is mounted by to an axle 188, with the axle 188 fitting within a U-Shaped wheel bracket 192. The wheel bracket 192 includes a wheel bracket plate 194 in an upper portion thereof, which has a notch 196 formed into an edge of the wheel bracket plate 194. A latch 198 has a square tube 200 with a pin 202 slidably mounted within the tube 200. The pin 202 has a tip 204 for fitting within the notch 296 in plate 194 of the wheel bracket 192. A bias spring 206 extends between a shoulder 208 in the forward end of the pin 202 and a boss 210 provided by the rearward end of the tube 200. A grip ring 212 is secured to the end of the pin 202 and two long slots 214 are provided on opposite sides of the rearward end of the tube 200 for receiving the grip ring 212. The two long slots 214 are formed into the rearward end of the tube 200, angularly spaced apart one hundred and eighty degrees about a longitudinal axis of the tube 200 and the pin 202. Two shorts slots 216 are also provided in the rearward end of the tube 200 for receiving the grp ring 212, angularly disposed ninety degrees about a longitudinal axis of the pin 202 from the long slots 214. The two short slots 216 are angularly spaced apart one hundred and eighty degrees about a longitudinal axis of the pin 202. The caster 178 has as conventional wheel brake 218 which is pivotally mounted to the wheel bracket 192.

The grip ring 212 is pulled from within the long slots 214 against the force of the spring 206, and then rotated and released to fit within the short slots 216. The long slots 214 and the short slots 216 are sized such that when the grip ring 212 is disposed in the short slots 216, the pin 202 is in a retraced position within the tube 200 and the end tip204 of the pin 202 does not extend far enough to fit within the notch 196 to prevent mounting bracket 192 from rotating relative to the mounting plate 182 and the plate 175. When the grip ring 212 is disposed in the long slots 214, the pin 202 extends from withing the tube 200 such that the end tip 204 of the pin 202 is disposed within the notch 196 in the wheel mounting bracket 192, preventing the mounting bracket 192 from rotating relative to the mounting plate 182 and the plate 175.

The present invention provides several advantages over prior art dollies for tow fixtures for securing motorcycles to tow trucks. A wheel support plate is provided which on top of which the wheels of the motorcycle are secured, and wheel stops and braces and chocks provided for securing the wheels atop the plates. The tow dollies caster wheels are provided mounted to outriggers to which tie lines are secured for securing the motorcycle thereto. For wheel lift tow trucks, the fixtures are mounted directly to the boom and the mast of the wheel lift tow truck for mounting the motorcycle thereto, preferably the motorcycle is lifted by a motorcycle jack and then the dollies or fixtures are fit thereunder. The front tow dolly has caster wheels mounted to outriggers such that the motorcycle is stabilized, and the rear dolly has a wide platform such that the rear of the motorcycle is stabilized. If the front wheel of the motorcycle is turned and locked, the front tow dolly may be used to place under the turned front wheel, and the forward caster wheels unlocked such that they are free to rotate for transporting the motorcycle with the motorcycle front wheel locked in a turned position. With the front tow dolly canted sidewalls to fit the turned front wheel of the motorcycle, the width of the rear tow dolly will stabilize the motorcycle to prevent the motorcycle from tipping over.

Although the above describes use of two different tow dollies and two different tow fixtures for towing a motorcycle, the same two dollies or the same two fixtures may be utilized for towing a motorcycle according to the present invention.

Although the preferred embodiment has been described in detail, it should be understood that various changes, substitutions and alterations can be made therein without departing from the spirit and scope of the invention as defined by the appended claims.

What is claimed is:

1. A motorcycle towing device for loading a motorcycle aboard a tow truck, said motorcycle device comprising:
    a front wheel support member having a front wheel support plate and a front wheel lateral support means moveably secured to said front support plate;
    a rear wheel support member having a rear wheel support plate and a rear wheel lateral support means moveably secured to said rear wheel support plate;
    tie down members for securing a motorcycle to said front wheel support member with a front wheel of the motorcycle secured atop said front wheel support plate and to said front wheel lateral support means and securing the motorcycle to said rear wheel support member atop said rear wheel support plate and to said rear wheel lateral support means;
    wherein said rear wheel lateral support means includes two spaced apart lateral support members, each of said lateral support members slidably secured to said rear wheel support member; and
    wherein said rear wheel support member further includes a rear support plate having spaced apart slots formed into said rear wheel support plate with lengths which extend perpendicular to a forward direction of the motorcycle when mounted to said rear wheel support member, and said two spaced apart lateral support members are secured to said rear wheel support plate by two bolts which extend into said slots in said rear wheel support plate.

2. The motorcycle towing device according to claim 1, wherein said front wheel support member and said rear wheel support member have mounting brackets and further include caster wheels secured to said mounting brackets.

3. The motorcycle towing device according to claim 1, wherein said front wheel support member and said rear wheel support member are directly mounted to a mast and a boom of a wheel lift tow truck.

4. The motorcycle towing device according to claim 1, wherein said rear support plate further comprises a plurality of lock apertures extending parallel to said slots, and said lateral support members further comprising cam locks which selectively extend into said lock apertures in said rear support plate.

5. The motorcycle towing device according to claim 1, wherein said front wheel lateral support means comprises a U-shaped lateral support secured atop said front wheel support plate.

6. The motorcycle towing device according to claim 5, wherein said front wheel support plate comprises a U-shaped plate having two sidewalls, said two sidewalls having slots therein for securing pins which secure said U-shaped lateral support member within said U-shaped plate.

7. The motorcycle towing device according to claim 6, further comprising a forward stop plate which is secured to a forward end of said front wheel support member, and extends upward at an angle to the front wheel support plate.

8. The motorcycle towing device according to claim 7, further comprising a wheel chock which is secured to said front wheel support member, spaced apart selected distances from said forward stop plate.

9. A motorcycle towing device for loading a motorcycle aboard a tow truck, said motorcycle device comprising:
    a front wheel support member having a front wheel support plate and a front wheel lateral support means moveably secured to said front wheel support plate;
    a rear wheel support member having a rear wheel support plate and rear wheel lateral support members moveably secured to said rear wheel support plate;
    tie down members for securing a motorcycle to said front wheel support member with a front wheel of the motorcycle secured atop said front wheel support plate and to said front wheel lateral support means and securing the motorcycle to said rear wheel support member atop said rear wheel support plate and to said rear wheel lateral support members;
    wherein said rear wheel lateral support means comprises two spaced apart lateral support members, each of said lateral support members slidably secured to said rear wheel support plate; and wherein said rear wheel support plate further comprises a plurality of lock apertures, and said lateral support members further comprising cam locks which selectively extend into said lock apertures in said rear wheel support plate.

10. The motorcycle towing device according to claim 9, further comprising a forward stop plate which is secured to a forward end of said front wheel support member, and extends upward from said front wheel support plate; and
  a wheel chock which is secured to said front wheel support member, spaced apart selected distances from said forward stop plate.

11. The motorcycle towing device according to claim 9, wherein said rear wheel support plate comprises spaced apart slots formed into said rear wheel support member with lengths which extend perpendicular to a forward direction of the motorcycle when mounted to said rear wheel support member, and said two spaced apart lateral support members are secured to said rear wheel support plate by two bolts which extend into said slots in said rear wheel support member.

12. The motorcycle towing device according to claim 11, wherein said front wheel lateral support means comprises a U-shaped lateral support secured atop said front wheel support plate; and
  wherein said front wheel lateral support plate comprises a U-shaped plate having two sidewalls, said two sidewalls having slots therein for securing pins which secure said U-shaped lateral support member within said U-shaped plate.

13. A motorcycle towing device for loading a motorcycle aboard a tow truck, said motorcycle device comprising:
  a front wheel support member having a front wheel support plate and a front wheel lateral support means moveably secured to said front wheel support plate;
  a rear wheel support member having a rear wheel support plate and rear wheel lateral support members slidably secured to said rear wheel support plate;
  tie down means for securing a motorcycle to said front wheel support member with a front wheel of the motorcycle secured atop said front wheel support plate and to said front wheel lateral support means and securing the motorcycle to said rear wheel support member atop said rear wheel support plate and to said rear wheel lateral support members;
  wherein said rear wheel lateral support members extend in parallel and are spaced apart members, each of said rear wheel lateral support members slidably secured to said rear wheel support plate;
  said rear wheel support plate having spaced apart slots formed into said rear wheel support plate with lengths which extend perpendicular to a forward direction of the motorcycle when mounted to said rear wheel support member, and said two spaced apart lateral support members are secured to said rear wheel support plate by two bolts which extend into said slots in said rear wheel support member; and
  wherein said rear wheel support plate further comprises a plurality of lock apertures extending parallel to said slots, and said lateral support members further comprising cam locks which selectively extend into said lock apertures in said rear wheel support plate.

14. The motorcycle towing device according to claim 13, wherein said front wheel lateral support means comprises a U-shaped lateral support secured atop said front wheel support plate;
  wherein said front wheel support plate comprises a U-shaped plate having two sidewalls, said two sidewalls having slots therein for securing pins which secure said U-shaped lateral support member within said U-shaped plate;
  wherein said front wheel support member further comprises a forward stop plate which is secured to a forward end of said front wheel support member, and extends upward from said front wheel support plate; and
  a wheel chock which is secured to said front wheel support member, spaced apart selected distances from said forward stop plate.

15. The motorcycle towing device according to claim 14, further comprising two T-shaped slots formed into sidewalls of said U-shaped plate of said front wheel support member for receiving fasteners which moveably secure said front wheel lateral support member to said front wheel support plate, and a cam lock for securing said rear wheel lateral support members in fixed relation to said rear wheel support plate.

16. A motorcycle towing device for loading a motorcycle aboard a tow truck, said motorcycle towing device comprising:
  a wheel support member having a wheel support plate;
  two spaced apart lateral support members which are moveably secured to said wheel support plate;
  tie down members for securing a motorcycle to said wheel support member with a wheel of the motorcycle secured atop said wheel support plate and adjacent said two spaced apart lateral support members;
  said wheel support plate including spaced apart slots formed into said wheel support plate with lengths which extend perpendicular to a forward direction of the motorcycle when mounted to said rear wheel support member, and said two spaced apart lateral support members are secured to said rear wheel support plate by bolts which extend into said slots in said rear wheel support plate; and
  wherein said wheel support plate further includes a plurality of lock apertures extending parallel to said slots, and said two spaced apart lateral support members include cam locks which selectively extend into said lock apertures in said support plate.

17. The motorcycle towing device according to claim 16, further comprising a second wheel support member which includes a U-shaped plate having two sidewalls, said two sidewalls having slots therein;
  a U-shaped lateral support member secured within said U-shaped plate by pins which extend into said slots of said two sidewalls of said U-shaped plate;
  a stop plate which is secured to a forward end of said second wheel support member, and extends upward from said second wheel support member; and
  a wheel chock which is secured to said second wheel support member, spaced apart selected distances from said stop plate.

* * * * *